United States Patent [19]

Zievers et al.

[11] Patent Number: 5,037,461
[45] Date of Patent: Aug. 6, 1991

[54] FILTRATION APPARATUS

[75] Inventors: James F. Zievers, LaGrange; Paul Eggerstedt, North Riverside; Elmer Kulousek, Berwyn, all of Ill.

[73] Assignee: Industrial Filter & Pump Mfg. Co., Cicero, Ill.

[21] Appl. No.: 411,644

[22] Filed: Sep. 25, 1989

[51] Int. Cl.⁵ .................... B01D 46/24; B01D 46/42
[52] U.S. Cl. ........................................ 55/482; 55/523; 210/323.2
[58] Field of Search .............. 210/322, 323.1, 323.2, 210/340, 341, 321.78, 321.79, 321.8, 321.87, 321.88, 321.89; 55/482, 483, 484, 490, 523

[56] References Cited

U.S. PATENT DOCUMENTS 4,904,287  2/1990  Lippert et al. .................... 55/302

Primary Examiner—Frank Sever

[57] ABSTRACT

A filter suitable for the filtration of high temperature gasses includes a high pressure tank enclosing a chamber divided into a plurality of separate chambers by horizontally disposed rigid tube sheets. A plurality of banks of filter tubes are positioned in mutual alignment between adjacent ones of the tube sheets. Guide channels are provided on the tops and bottoms of the tube sheets for sealably mounting the filter tubes in place between the tube sheets. Fluid outlets open to the ambient through the wall of the tank between each adjacent pair of tube sheets and covers are removably secured over openings in the wall of the tank for access to the filter tubes.

8 Claims, 2 Drawing Sheets

FILTRATION APPARATUS

The present invention relates in general to pressure filters of the type used in the filtration of hot gasses, and it relates more particularly to a new and improved candle filter in which a plurality of candle or tubular filter elements are disposed in a plurality of tiers in a single pressurized tank.

BACKGROUND OF THE INVENTION

Tubular or candle filter elements formed of a porous ceramic are commonly used for filtering hot gasses having a temperature of 1200 degrees F. or more. Sealably mounting such filter elements has presented problems particularly where a large number of the filter elements are to be mounted in a single filter tank.

SUMMARY OF THE INVENTION

Briefly, in accordance with the present invention there is provided a novel method of mounting a large number of filter tubes or candles in a single filter tank. In this system a plurality of filter tube support sheets are mounted in vertically spaced relationship in a filter tank and a plurality of ceramic filter tubes are mounted in tiers between the sheets with the tubes in the respective tiers being axially aligned with the tubes in the other tiers.

The fluid to be filtered is supplied from the top of the tank down through the tubes, and a plurality of outlet ports are provided in the tank between the support sheets for carrying the filtered gas from the tank.

In accordance with another aspect of the invention external annular flanges on the ends of the filter elements are disposed in channels provided on the tops and bottoms of the support sheets. The tubes are located in alignment with holes through the sheets by means of locking rods which extend through locator holes in the channels on opposite sides of the filter elements. The rods also function to hold the filter tubes and associated end gaskets against the support sheets to provide seals which prevent the dirty fluid from bypassing the filter tubes.

GENERAL DESCRIPTION OF THE DRAWINGS

Further objects and advantages and a better understanding of the present invention will be had by reference to the following detailed description taken in connection with the accompanying drawings wherein.

DETAILED DESCRIPTION OF A PREFERRED EMBODIMENT OF THE INVENTION

Figure 1:
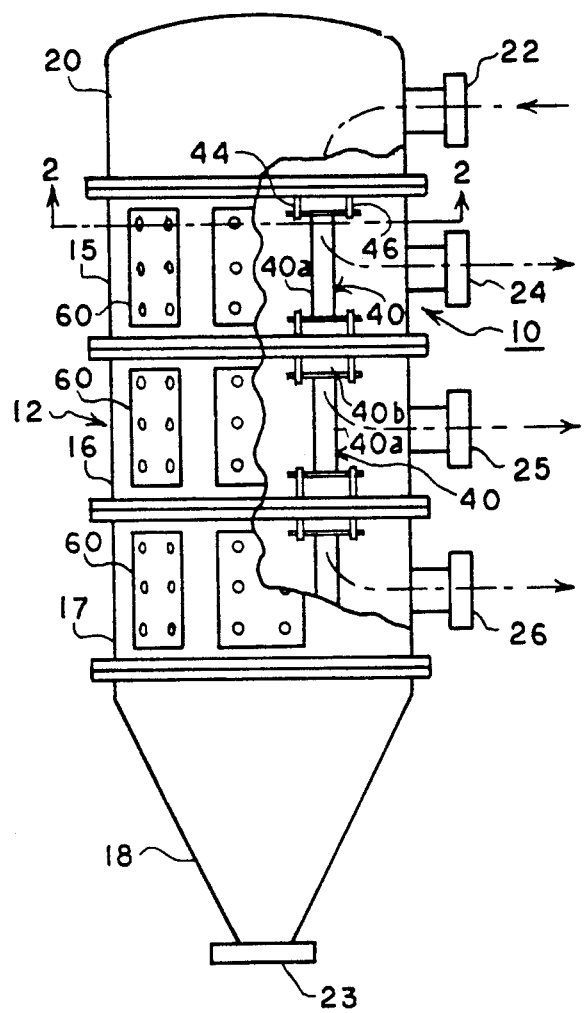
FIG. 1 is an elevational schematic view of a pressure filter embodying the present.

With particular reference to FIG. 1, there is shown a pressure filter 10 comprising a tank 12 made up of a plurality of tubular cylindrical sections 15, 16, 17, a generally conical bottom section 18 and a top or cover section 20 all sealably connected together in the conventional manner. A fluid inlet 22 opens into the top or cover section 20, and a plurality of fluid outlets 24, 25 and 26 open respectively into the sections 15, 16 and 17. An outlet 23 is provided at the bottom of the conical section 18 for the removal of the solids which have been removed from the fluid passing through the filter.

A plurality of rigid metal plates 30 (FIG. 2) are sealably mounted in the tank 12 in proximity to the junctions between the section 20, 15, 16, 17 and 18 and separate the chamber in the tank 12 into five separate chambers. The fluid outlets 24, 25, and 26 carry the filtered or clean fluid from the filter.

Figure 2:
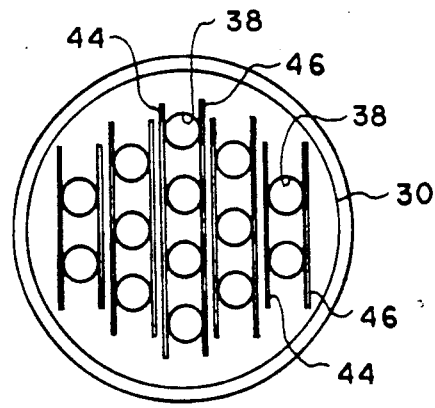
FIG. 2 is a horizontal cross-sectional view of the filter of FIG. 2 taken along the line 2—2 thereof.
Figure 3:
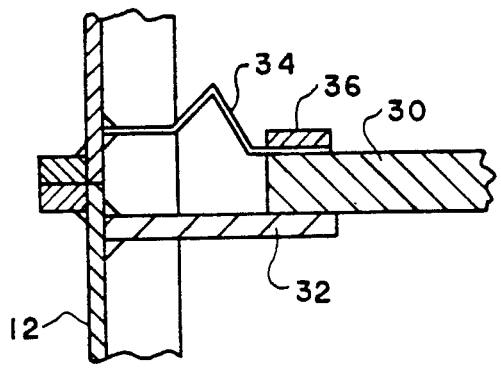
FIG. 3 is a fragmentary sectional view showing the support for the tube sheet in the filter of FIG. 1.
Figure 4:
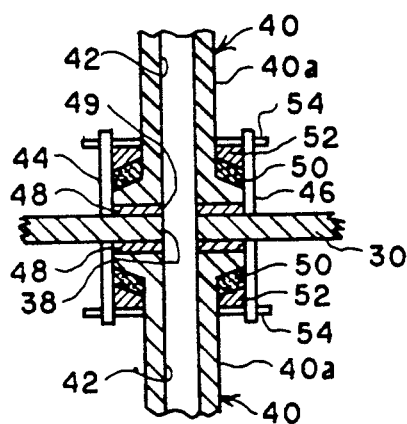
FIG. 4 is a fragmentary sectional view showing the manner in which the tube support sheets are sealably mounted in the filter tank.

As best shown in FIGS. 2 and 3, the plates 30 are supported on shelves 32 which are respectively welded to the walls of the sections 15, 16, 17 and 18, and they are hermetically sealed to the same wall sections by a flexible metal, corrugated ring 34. The ring is a diaphragm and is sealed to the wall of the tank and to the associated plate 30. Its purpose is to permit expansion and contraction of the plate 30 without damage to the filter. The outer edge of the ring 34 is welded to the wall of the tank, and the inner edge portion of the ring 34 is sealably fitted between the top of the associated plate 30 and a metal ring 36 which is welded to the plate 30.

A plurality of circular holes 38 arranged in straight rows extend through the plates 30 as shown in FIG. 2. Mounted between the plates 30 in line with the holes 38 therein are a plurality of filter tubes 40. The tubes 40 each have a tubular central or body section 40a and upper and lower external flanges 40b and 40c. A cylindrical bore 42 having a diameter equal to that of the holes extends completely through each of the filter tubes. The filter tubes 40 are formed of a suitable porous material through which the fluid to be filtered passes to the outlets 24, 25, and 26.

Figure 5:
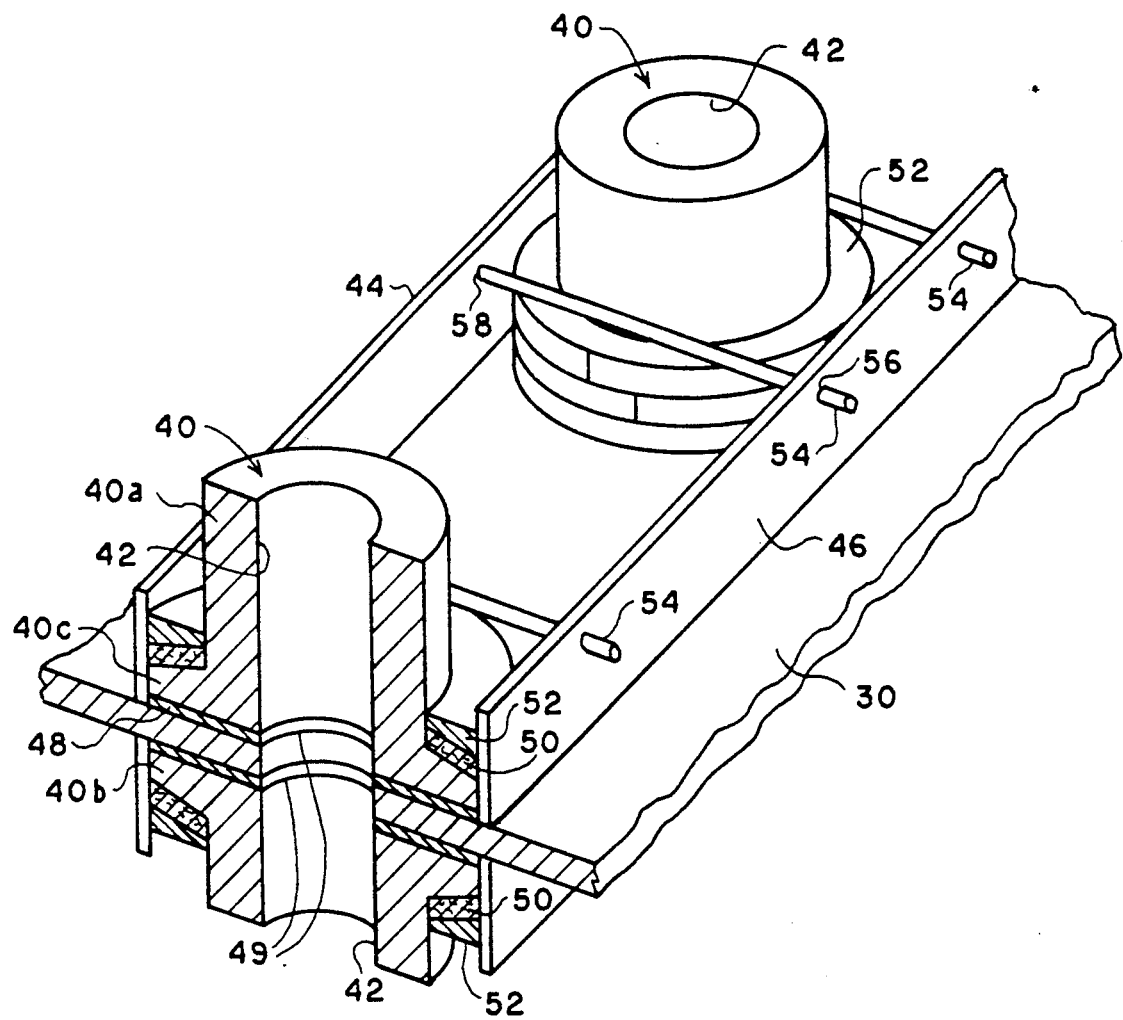
FIG. 5 is an isometric view showing the manner in which the filter tubes are sealably mounted to the support sheets.

With particular reference to FIGS. 5 and 6, it will be seen that the ends of the filter tubes 40 are flat and the flanges 40b and 40c are tapered toward the body section 40a. A plurality of guide channels are provided on both sides of the support plates 30 for each row of the holes 38, and the channels are each formed by a pair of upstanding parallel elongated plates 44 and 46 which are welded to the plates 30. A plurality of elongate gaskets 48 are positioned in the bottom of the guide channels between the side plates 44 and 46 and have circular holes 49 thereon respectively aligned with the holes 38 in the plates 30. A plurality of radially split resilient gaskets 50 are positioned over the tapered sides of the flanges 40b and 40c and split metal rings 52 overly the gaskets 50. The gaskets 48 and 50 are held in compressed sealing relationship between the filter tubes and the plates 30 by means of a plurality of rigid metal rods 54 which extend through aligned holes 56 and 58 in the guide plates 44 and 46. In addition to holding the gaskets in compression the holes 56 and 58 assure precise alignment of the bores 42 in the filter tubes 40 with the holes 38 in the support plates 30.

In order to facilitate the removal, inspection and replacement of individual filter tubes, each of the tank sections 15, 16, 17 and 18 is provided with cover plates 60 which are respectively aligned with the rows of filter tubes. If desired, one large cover plate may be provided for each section of the tank.

The filter 10 is particularly suited for use with high temperature flue gasses or the like. When thus used, the filter tubes will be formed of ceramic or other materials which can withstand temperatures of about 1200 degrees F. or more. Preferably the gaskets 48 and 50 are formed of a material that increases in size as its temperature increases thereby to assure a tight gas seal between the filter tubes 40 and the support plates 30. One such material is Interam manufactured by 3-M Co.

In operation the fluid to be filtered enters the filter 15 through the inlet 22 at the top at a high pressure of up to 450 p.s.i. and flows down through the filter tubes 40. The entrained solids collect on the inner walls of the filter tubes. Initially, the fluid flows primarily through the upper bank of filters, but as the cakes build up on the upper filter tubes the flow through the lower banks of filter tubes increases. Periodically, the filter tubes are cleaned by reversing the flow of gas therethrough. During the cleaning operation the solids fall to the bottom section 18 and are removed from the tank through the bottom outlet 23 at that time or during a subsequent cleaning operation.

While the present invention has been described in connection with a particular embodiment thereof, it will be understood by those skilled in the art that many changes may be made without departing from the true spirit and scope of the present invention. Therefore, it is intended by the appended claims to cover all such changes and modifications which come within the true spirit and scope of this invention.

What is claimed:

1. Filtration apparatus, comprising in combination
   a filter tank enclosing a chamber,
   a plurality of horizontally orientated rigid plates extending in vertically spaced parallel relationship across said tank, means for providing effective sealing for hot gases including first sealing means sealing the peripheries of said plates to said tank to seal the portions of said chamber above and below said plates from one another,
   said plates each having a plurality of openings therethrough,
   said openings in said plates being in mutual vertical alignment,
   a plurality of straight, porous filter tubes each having external flanges at opposite ends thereof and being open at opposite ends thereof,
   second sealing means sealably mounting said filter tubes between said plates in alignment with respective ones of said openings in said plates,
   a fluid inlet opening into the top portion of said chamber above the uppermost one of said plates, and
   a fluid outlet extending from said tank and opening into said chamber at a location between said plates.

2. Filtration apparatus according to claim 1 wherein said filter tubes are formed of a ceramic.

3. Filtration apparatus according to claim 1 wherein said openings in said plates are arranged in straight rows, and said sealing means comprises
   a plurality of elongated channels on said plates enclosing respective ones of said rows of openings,
   said channels being respectively defined by a pair of spaced members,
   said spaced members being provided with holes adjacent said openings, and
   a plurality of rods extending through and between said holes adjacent said filter tubes for locking said filter tubes to said plates.

4. Filtration apparatus according to claim 3, wherein said second sealing means comprises
   elongate gasket means disposed in said channels between said filter tubes and said plate and having apertures aligned with associated ones of said openings and said filter tubes.

5. Filtration apparatus according to claim 3 wherein said channels are provided on both the tops and bottoms of said plates.

6. Filtration apparatus according to claim 5 wherein said first sealing means comprises
   imperforate flexible means connected between said tank and said plates.

7. Filtration apparatus, comprising in combination
   a filter tank enclosing a chamber,
   at least three horizontally oriented rigid plates extending in vertically spaced parallel relationship across said tank dividing said tank into an upper section and at least two vertically spaced sections disposed below said upper section, means for providing effective sealing for hot gases including first sealing means sealing the peripheries of said plates to said tank to seal the sections of said chamber above and below said plates from one another,
   said plates each having a plurality of vertically aligned openings therethrough,
   a plurality of straight, porous filter tubes having open opposite ends sealably connected to adjacent ones of said plates over said openings,
   a fluid inlet opening into said top section of said chamber above the uppermost one of said plates, and
   a plurality of fluid outlets extending from said tank and respectively opening into said sections between said plates.

8. Filtration apparatus according to claim 7 wherein said filter tubes are formed of a ceramic.

* * * * *